(12) United States Patent
Thorn

(10) Patent No.: US 7,747,160 B2
(45) Date of Patent: Jun. 29, 2010

(54) INTELLIGENT RED EYE REMOVAL

(75) Inventor: Ola Thorn, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 182 days.

(21) Appl. No.: 11/969,697

(22) Filed: Jan. 4, 2008

(65) Prior Publication Data

US 2009/0175613 A1    Jul. 9, 2009

(51) Int. Cl.
  *G03B 15/03*    (2006.01)
(52) U.S. Cl. ........................................ 396/158
(58) Field of Classification Search ............. 396/157, 396/158; 382/275
  See application file for complete search history.

(56) References Cited

U.S. PATENT DOCUMENTS

| 5,300,970 | A | 4/1994 | Fukuhara et al. |
| 6,278,491 | B1 * | 8/2001 | Wang et al. ............... 348/370 |
| 2004/0223063 | A1 | 11/2004 | DeLuca et al. |
| 2006/0129950 | A1 * | 6/2006 | Zhao et al. ............... 715/810 |

FOREIGN PATENT DOCUMENTS

| EP | 0 437 076 A1 | 7/1991 |
| GB | 2 308 668 A | 7/1997 |

OTHER PUBLICATIONS

Patrick Reignier; "Finding a face by blink detection"; ECVNet; Jul. 21, 1995, 2 pages.
Haro et al., "Detecting and Tracking Eyes By Using Their Physiological Properties, Dynamics, and Appearance", IEEE Computer Conference on Computer Vision and Pattern Recognition, IEEE Comp., Jun. 13, 2000, pp. 163-168.
Notification of Transmittal of the International Search Report and the Written Opinion of the International Searching Authority, or the Declaration corresponding to PCT/IB2008/052643, dated Jul. 7, 2009, 15 pages.

* cited by examiner

*Primary Examiner*—W. B. Perkey
*Assistant Examiner*—Minh Q Phan
(74) *Attorney, Agent, or Firm*—Harrity & Harrity, LLP

(57) ABSTRACT

A device measures one or more of a distance from an eye of a subject, a blink of the eye, and lighting adjacent to the subject, calculates automated red eye removal settings based on one or more of the measured distance, blink, and lighting, automatically removes red eye from an image of the subject based on the calculated automated red eye removal settings, captures the image of the subject, and stores the captured image.

22 Claims, 12 Drawing Sheets

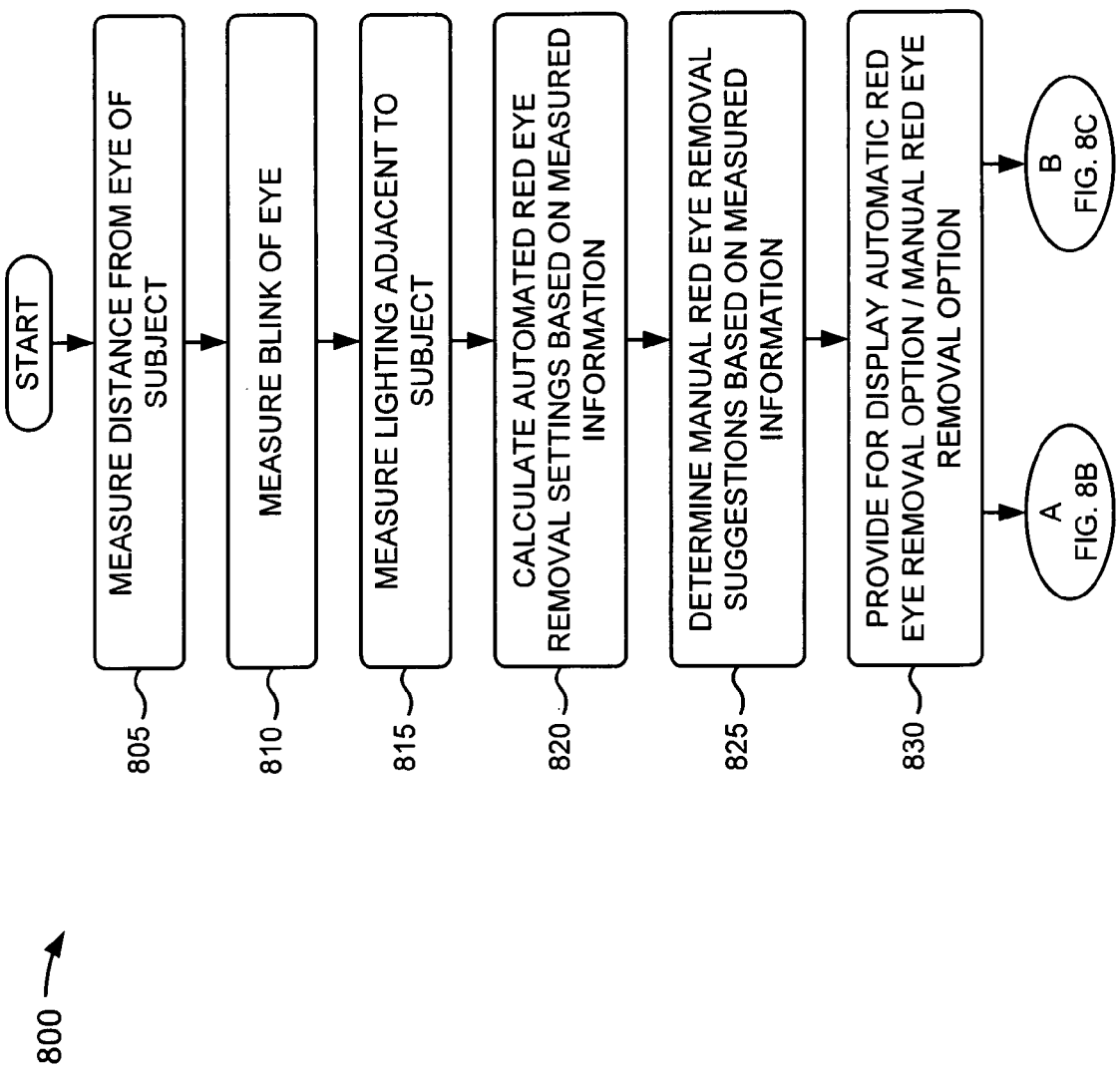

INTELLIGENT RED EYE REMOVAL

BACKGROUND

Images may be captured by a variety of consumer electronic devices, such as mobile communication devices (e.g., cell phones, personal digital assistants (PDAs), etc.), cameras (e.g., contemporary cameras or digital cameras), video cameras, etc. Many times, captured images of eyes of a subject (e.g., a person, an animal, etc.) may be ruined due to red-eye effect (or "red eye"). The red-eye effect is the appearance of red eyes in images captured using a flash device or flash. Light from the flash occurs too fast for the iris of the eye to close the pupil. Light is passed through a blood-rich area (called the choroid) alongside the iris and then strikes the retina. Some of the light is reflected back out through the iris, and a captured image records this reflected red light, which has passed twice through the reddish choroid. The red-eye effect may include color variations of the reflected light from species to species (e.g., cats may display blue, yellow, pink, or green eyes in images captured with flash).

SUMMARY

According to one aspect, a method may include measuring one or more of a distance from an eye of a subject, a blink of the eye, and lighting adjacent to the subject, calculating automated red eye removal settings based on one or more of the measured distance, blink, and lighting, automatically removing red eye from an image of the subject based on the calculated automated red eye removal settings, capturing the image of the subject, and storing the captured image.

Additionally, the method may include providing for display an automatic red eye removal option, and receiving selection of the automatic red eye removal option.

Additionally, the method may include determining manual red eye removal suggestions based on the measured distance, blink, and lighting, providing for display a manual red eye removal option, receiving selection of the manual red eye removal option, providing for display the manual red eye removal suggestions, and capturing the image of the subject when the manual red eye removal suggestions remove red eye.

Additionally, the method may include providing for display a suggestion to increase ambient lighting or providing for display a suggestion to move toward or away from the subject.

Additionally, the method may include automatically removing red eye from the subject image by increasing or decreasing a length of time of a pre-flash, automatically removing red eye from the subject image by delaying a flash of a device until the subject looks away from the device, automatically removing red eye from the subject image by directing light from the flash at an oblique angle to the eye, automatically removing red eye from the subject image by opening a lens aperture and omitting the flash, or automatically removing red eye from the subject image by reducing a shutter speed and omitting the flash.

According to another aspect, a user device may include a distance monitoring device that measures a distance from an eye of a subject, a blink monitoring device that measures a blink of the eye, a lighting monitoring device that measures lighting adjacent to the subject, and processing logic configured to calculate automated red eye removal settings based on the measured distance, blink, and lighting, automatically remove red eye from an image of the subject based on the calculated automated red eye removal settings, and capture the subject image.

Additionally, the distance monitoring device may include one of a proximity sensor, a laser distance sensor, a distance sensor using echo location with high frequency sound waves, or an infrared distance sensor.

Additionally, the blink monitoring device may include one of an eye gazing sensor, an infrared camera and infrared illuminator combination, or a device used to sense, locate, and follow the movement of the eye.

Additionally, the blink monitoring device may detect the blink as a dual symmetrical difference in images of the subject.

Additionally, the lighting monitoring device may include one of an ambient light sensor, a charge coupled device (CCD) light sensor, or a complementary metal oxide semiconductor (CMOS) light sensor.

Additionally, the processing logic may be configured to provide for display an automatic red eye removal option, and receive selection of the automatic red eye removal option.

Additionally, the processing logic may be configured to provide for display the subject image with red eyes prior to the automatic removal of red eye, provide for display the subject image with non-red eyes after the automatic removal of red eye, provide for display an indication of removal of red eye, and provide for display instructions for capturing the subject image.

Additionally, the processing logic may be configured to determine manual red eye removal suggestions based on the measured distance, blink, and lighting, provide for display a manual red eye removal option, receive selection of the manual red eye removal option, provide for display the manual red eye removal suggestions, and automatically capture the subject image when the manual red eye removal suggestions remove red eye.

Additionally, the processing logic may be configured to at least one of provide for display a suggestion to increase ambient lighting, or provide for display a suggestion to move toward or away from the subject.

Additionally, the processing logic may be configured to provide for display the subject image with red eyes prior to the manual removal of red eye, provide for display the subject image with non-red eyes when the manual red eye removal suggestions remove red eye, provide for display an indication of removal of red eye, and provide for display instructions for capturing the subject image.

Additionally, the processing logic may be configured to at least one of automatically remove red eye from the subject image by increasing or decreasing a length of time of a pre-flash, automatically remove red eye from the subject image by delaying a flash until the subject looks away from the user device, automatically remove red eye from the subject image by directing light from the flash at an oblique angle to the eye, automatically remove red eye from the subject image by opening a lens aperture and omitting the flash, or automatically remove red eye from the subject image by reducing a shutter speed and omitting the flash.

Additionally, the user device may include one of a mobile communication device, a laptop, a personal computer, a camera, a video camera, binoculars with a camera, or a telescope with a camera.

According to yet another aspect, a user device may include one or more devices configured to measure a distance from an eye of a subject whose image is to be captured, measure a blink of the eye, and measure lighting adjacent to the subject.

The user device may also include processing logic configured to provide for display an automatic red eye removal option and a manual red eye removal option, receive selection of the automatic red eye removal option or the manual red eye removal option, calculate automated red eye removal settings based on the measured distance, blink, and lighting when the automatic red eye removal option is selected, automatically remove red eye from an image of the subject based on the calculated automated red eye removal settings when the automatic red eye removal option is selected, determine manual red eye removal suggestions based on the measured distance, blink, and lighting when the manual red eye removal option is selected, provide for display the manual red eye removal suggestions when the manual red eye removal option is selected, and enable the subject image to be captured when red eye is removed.

Additionally, the processing logic may be configured to provide for display the subject image with red eyes prior to the removal of red eye, provide for display the subject image with non-red eyes when red eye is removed, provide for display an indication of removal of red eye, and provide for display instructions for capturing the subject image.

According to a further aspect, a system may include means for measuring a distance from an eye of a subject, means for measuring a blink of the eye, means for measuring lighting adjacent to the subject, means for calculating automated red eye removal settings based on the measured distance, blink, and lighting, means for automatically removing red eye from an image of the subject based on the calculated automated red eye removal settings, means for capturing the image of the subject, and means for storing the captured subject image.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Overview

Implementations described herein may predict red eye by detecting eyes of a subject (e.g., whose image is to be captured) using eye blinks, and may eliminate red eye by increasing light sensitivity or by adapting a pre-flash length of time based on a risk of red eye. For example, in one implementation, a user device may measure a distance from an eye of the subject, may measure a blink of the subject's eye, and may measure lighting adjacent to the subject. The user device may also calculate automated red eye removal settings based on the measured information, may determine manual red eye removal suggestions based on the measured information, and may provide for display an automatic red eye removal option and/or a manual red eye removal option. If the user device receives selection of the automatic red eye removal option, the user device may automatically remove red eye based on the calculated automated red eye removal settings, and may capture an image of the subject. If the user device receives selection of the manual red eye removal option, the user device may provide for display the manual red eye removal suggestions, and may capture the image of the subject when the manual suggestions remove red eye.

Exemplary Configuration

Figure 1:
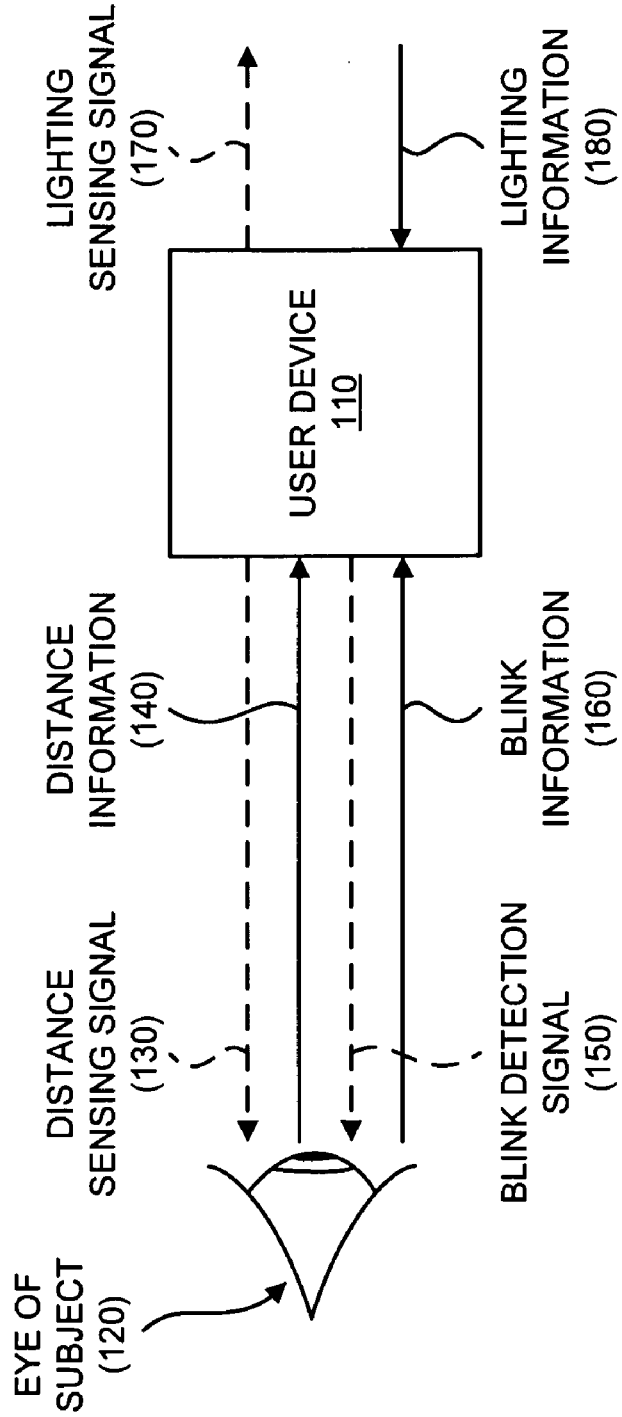
FIG. 1 is an exemplary diagram illustrating a configuration according to concepts described herein.

FIG. 1 is an exemplary diagram illustrating a configuration 100 according to concepts described herein. As illustrated, configuration may include a user device 110 and an eye 120 of a subject whose image is to be captured by user device 110.

User device 110 may include any device capable of capturing an image. For example, user device 110 may include a mobile communication device (e.g., a radiotelephone, a personal communications system (PCS) terminal that may combine a cellular radiotelephone with data processing, a facsimile, and data communications capabilities, a personal digital assistant (PDA) that can include a radiotelephone, pager, Internet/intranet access, web browser, organizer, camera, a Doppler receiver, and/or global positioning system (GPS) receiver, a GPS device, a telephone, a cellular phone, etc.); a laptop; a personal computer; a printer; a facsimile machine; a pager; a camera (e.g., a contemporary camera or a digital camera); a video camera (e.g., a camcorder); a calculator; binoculars; a telescope; a GPS device; a gaming device; any other device capable of utilizing a camera; a thread or process running on one of these devices; and/or an object executable by one of these devices.

As used herein, a "camera" may include a device that may capture and store images and/or video. For example, a digital camera may be an electronic device that may capture and store images and/or video electronically instead of using photographic film as in contemporary cameras. A digital camera may be multifunctional, with some devices capable of recording sound and/or video, as well as images.

Eye 120 may include one or more eyes of a subject (e.g., a person, an animal, etc.) whose image is to be captured by user device 110. In one implementation, for example, eye 120 may produce the red-eye effect if user device 110 attempts to capture an image of the subject using a flash. Flash may include a device (e.g., an electronic flash unit) that produces an instantaneous flash of artificial light (e.g., around 1/3000 of a second) at a color temperature (e.g., about 5500K) to help illuminate a scene, capture quickly moving objects, create a different temperature light than ambient light, etc.

As further shown in FIG. 1, user device 110 may generate a distance sensing signal 130 that may be used to detect a distance between user device 110 and eye 120. A detected signal may be returned to user device 110 as distance information 140 (e.g., a distance between user device 110 and eye 120). User device 110 may also generate a blink detection signal 150 that may be used to detect a blink of eye 120. A detected signal may be returned to user device 110 as blink information 160. Blink information 160 may represent one or more blinks (e.g., closings and openings) of eye 120, and pupil information (e.g., an abnormal circular shape where the one or more blinks are detected, a contractile aperture in the iris of eye 120, etc.) associated with eye 120. Depending on distance information 140, blink information 160 may provide an indication of a risk for red eye. User device 110 may generate a lighting sensing signal 170 that may be used to detect lighting in an area adjacent to and/or at eye 120. A detected signal may be returned to user device 110 as lighting information 180 (e.g., ambient lighting in an area adjacent to and/or at the subject). Further details of user device 110 are provided below in connection with FIGS. 2-7.

Although FIG. 1 shows exemplary elements of configuration 100, in other implementations, configuration 100 may contain fewer, different, or additional elements than depicted in FIG. 1.

Exemplary User Device Configuration

Figure 2:
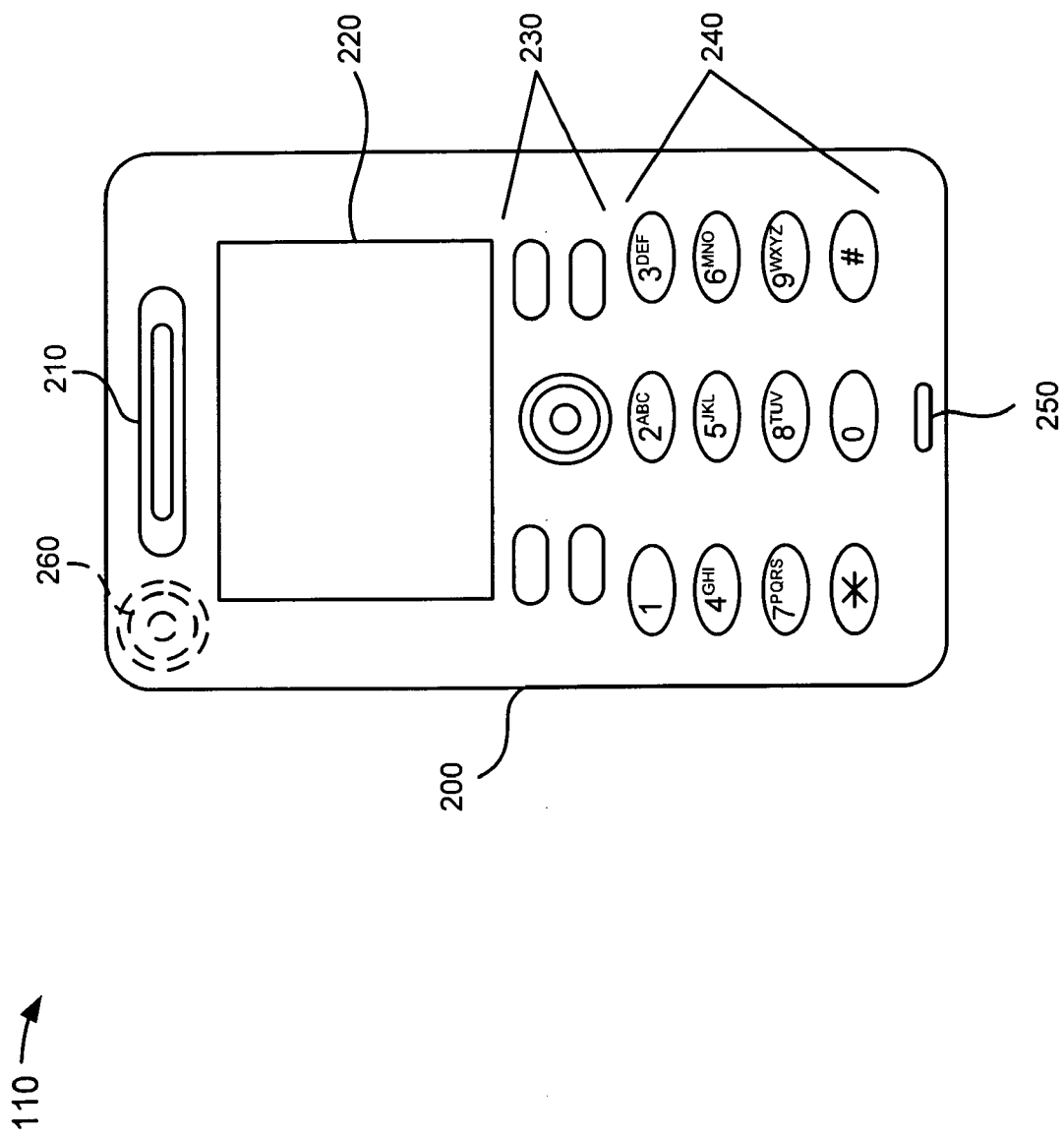
FIG. 2 depicts an exemplary diagram of a user device, illustrated in FIG. 1.

FIG. 2 is an exemplary diagram of user device 110. As illustrated, user device 110 may include a housing 200, a speaker 210, a display 220, control buttons 230, a keypad 240, a microphone 250, and/or a camera 260. Housing 200 may protect the components of user device 110 from outside elements. Speaker 210 may provide audible information to a user of user device 110.

Display 220 may provide visual information to the user. For example, display 220 may display text input into user device 110, text, images, video, and/or graphics received from another device, and/or information regarding incoming or outgoing calls or text messages, emails, media, games, phone books, address books, the current time, etc. In one exemplary implementation, display 220 may provide act as a viewfinder that may aid user device 110 in capturing and/or storing video and/or images. Control buttons 230 may permit the user to interact with user device 110 to cause user device 110 to perform one or more operations. For example, control buttons 230 may be used to cause user device 110 to transmit information. Keypad 240 may include a standard telephone keypad. Microphone 250 may receive audible information from the user. Camera 260 may be provided on a back side of user device 110, and may enable user device 110 to capture and/or store video and/or images (e.g., pictures).

Although FIG. 2 shows exemplary components of user device 110, in other implementations, user device 110 may contain fewer, different, or additional components than depicted in FIG. 2. In still other implementations, one or more components of user device 110 may perform one or more other tasks described as being performed by one or more other components of user device 110.

Figure 3:
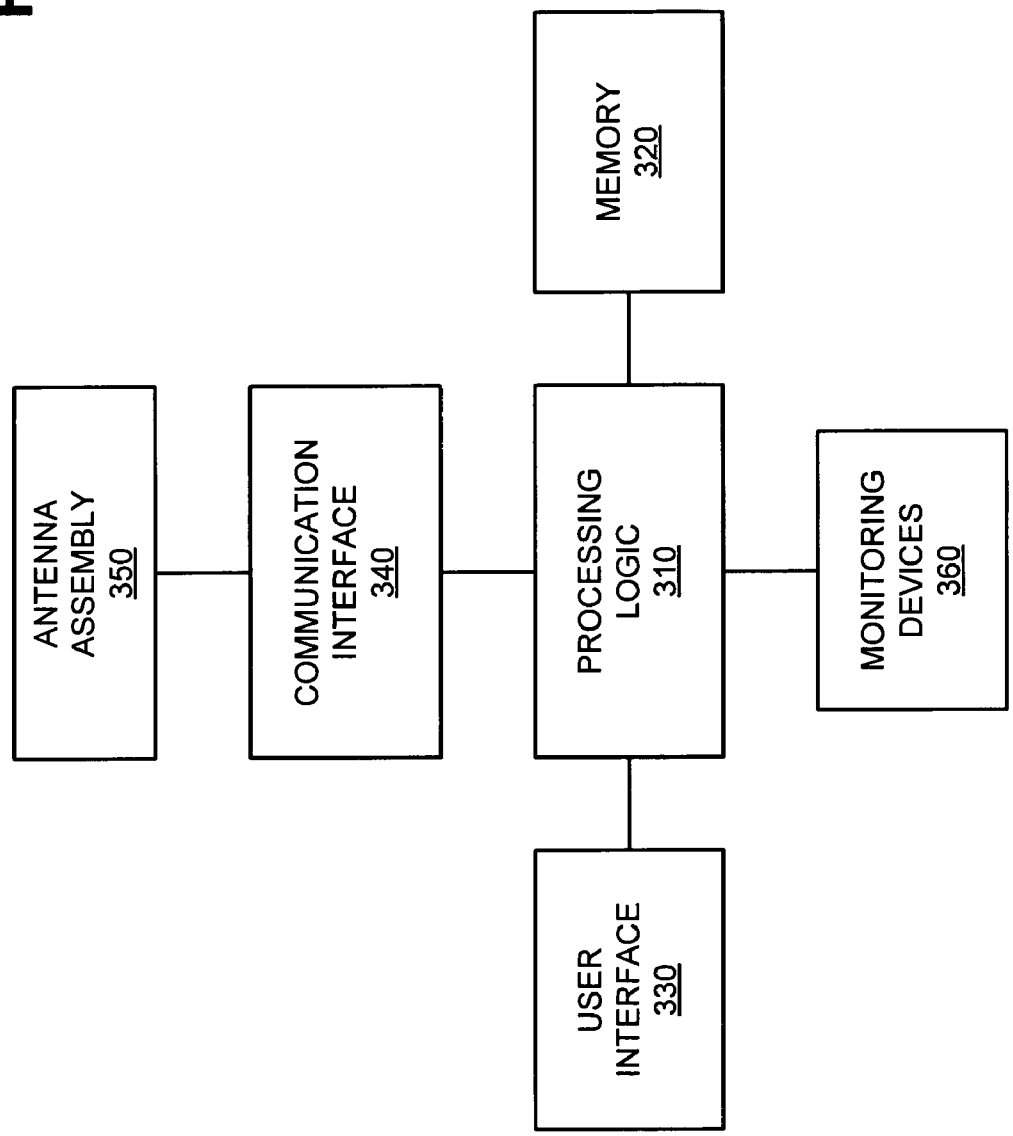
FIG. 3 illustrates a diagram of exemplary components of the user device depicted in FIGS. 1 and 2.

FIG. 3 is a diagram of exemplary components of user device 110. As illustrated, user device 110 may include processing logic 310, memory 320, a user interface 330, a communication interface 340, an antenna assembly 350, and/or one or more monitoring devices 360.

Processing logic 310 may include a processor, a microprocessor, an application specific integrated circuit (ASIC), a field programmable gate array (FPGA), or the like. Processing logic 310 may control operation of user device 110 and its components. In one implementation, processing logic 310 may control operation of components of user device 110 in a manner described herein.

Memory 320 may include a random access memory (RAM), a read-only memory (ROM), and/or another type of memory to store data and instructions that may be used by processing logic 310.

User interface 330 may include mechanisms for inputting information to user device 110 and/or for outputting information from user device 110. Examples of input and output mechanisms might include buttons (e.g., control buttons 230, keys of keypad 240, a joystick, etc.) or a touch screen interface to permit data and control commands to be input into user device 110; a speaker (e.g., speaker 210) to receive electrical signals and output audio signals; a microphone (e.g., microphone 250) to receive audio signals and output electrical signals; a display (e.g., display 220) to output visual information (e.g., text input into user device 110); a vibrator to cause user device 110 to vibrate; and/or a camera (e.g., camera 260) to receive video and/or images.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air, and receive RF signals over the air and provide them to communication interface 340. In one implementation, for example, communication interface 340 may communicate with a network and/or devices connected to a network.

Monitoring devices 360 may include any device capable of monitoring conditions associated with a subject (e.g., eye 120 of the subject) whose image is to be captured by user device 110. For example, in one implementation, monitoring devices 360 may include a distance monitoring device (e.g., a proximity sensor, a laser distance sensor, etc.), a blink monitoring device (e.g., an eye gazing sensor, an infrared camera and infrared illuminator combination, etc.), and/or a lighting monitoring device (e.g., an ambient light sensor, a charge coupled device (CCD) light sensor, a complementary metal oxide semiconductor (CMOS) light sensor, etc.). Further details of monitoring devices 360 are provided below in connection with FIG. 4.

As will be described in detail below, user device 110 may perform certain operations described herein in response to processing logic 310 executing software instructions of an application contained in a computer-readable medium, such as memory 320. A computer-readable medium may be defined as a physical or logical memory device. The software instructions may be read into memory 320 from another computer-readable medium or from another device via communication interface 340. The software instructions contained in memory 320 may cause processing logic 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of user device 110, in other implementations, user device 110 may contain fewer, different, or additional components than depicted in FIG. 3. In still other implementations, one or more components of user device 110 may perform one or more other tasks described as being performed by one or more other components of user device 110.

Exemplary Monitoring Devices/Interactions with Processing Logic

Figure 4:
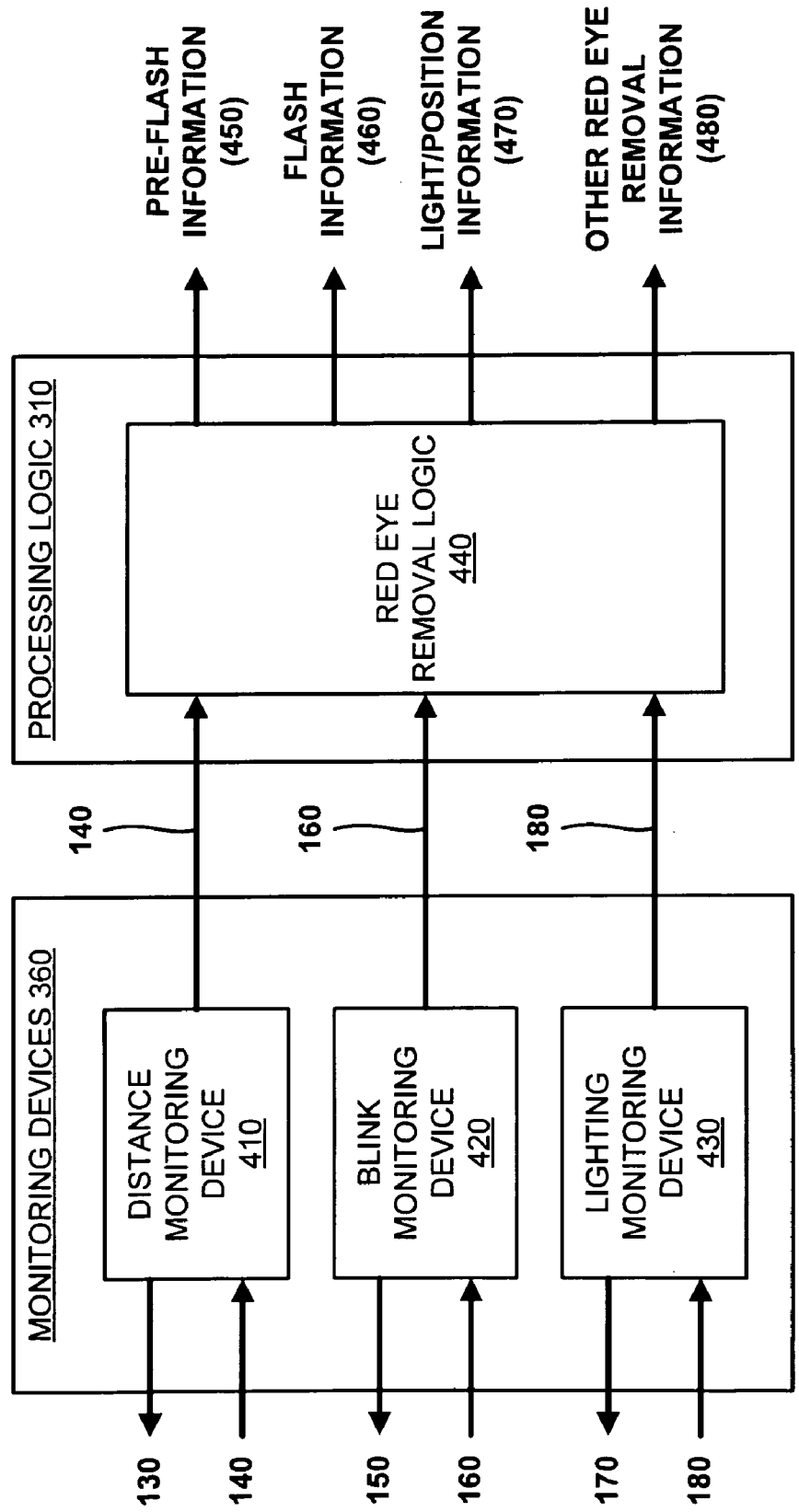
FIG. 4 depicts a diagram of exemplary monitoring devices and interactions with processing logic of the user device illustrated in FIGS. 1 and 2.

FIG. 4 is an exemplary diagram 400 of monitoring devices 360 and interactions with processing logic 310. As illustrated, monitoring devices 360 may include a distance monitoring device 410, a blink monitoring device 420, and/or a lighting monitoring device 430, and processing logic 310 may include red eye removal logic 440.

Distance monitoring device 410 may include any device capable of measuring a distance between user device 110 and a subject (e.g. eye 120 of the subject) whose image is to be captured by user device 110. For example, in one implementation, distance monitoring device 410 may include a proximity sensor, a laser distance sensor, a distance sensor using echo location with high frequency sound waves, an infrared distance sensor, other distance sensors capable of measuring the distance to the eye of the subject, etc. In other implementations, distance monitoring device 410 may include other components of user device 110 that are capable of measuring distance, such as processing logic 310. As further shown in FIG. 4, distance monitoring device 410 may generate distance sensing signal 130, and may receive distance information 140 in response to distance sensing signal 130. Distance monitoring device 410 may provide distance information 140 to processing logic 310 (e.g., to red eye removal logic 440).

Blink monitoring device 420 may include any device capable of measuring one or more blinks of an eye (e.g., eye 120) or eyes of the subject. For example, in one implementation, blink monitoring device 420 may include an eye gazing sensor, an infrared camera and infrared illuminator (e.g., a laser emitting diode) combination, a device used to sense, locate, and follow the movement of an eye(s), any other sensor capable of detecting eye blinks, etc. For example, in one implementation, user device 110 (e.g., a camera) may focus on one or both eyes of the subject and may record blinks as the subject focuses upon user device 110. Contrast may be used to locate the center of the pupil, infrared beams may be used to create a corneal reflection, and the triangulation of both may be used to determine the blinks of the subject's eye(s). In other implementations, blink monitoring device 420 may include other components of user device 110 that are capable of measuring blinks, such as processing logic 310.

In still other implementations, user device 110 (e.g., blink monitoring device 420) may acquire images of the subject (e.g., via display 220). As each image is acquired, blink monitoring device 420 may subtract a previous image to obtain a difference image. The resulting difference image may include a small boundary region around the outside of the subject's head. If the subject's eyes happen to be closed in one of the two images, there may also be two small round regions over the eyes where a difference may be significant. Blink monitoring device 420 may threshold (i.e., segment) the difference image, and may execute a connected components algorithm on the threshold image. Blink monitoring device 420 may calculate a bounding box for each connected component. A candidate for an eye may include a bounding box within a particular horizontal and vertical size. Blink monitoring device 420 may detect two such candidates with a horizontal separation of a certain range of sizes, and a small vertical difference in vertical separation. If blink monitoring device 420 detects this configuration of two small bounding boxes, a pair of blinking eyes may be determined (i.e., a blink may be detected as a dual symmetrical (e.g., elliptical) difference in the images). Such blink monitoring device 420 may be used in dark conditions to find a blink because it looks for blinks rather than facial features.

As further shown in FIG. 4, blink monitoring device 420 may generate blink detection signal 150, and may receive blink information 160 in response to blink detection signal 150. Blink monitoring device 420 may provide blink information 160 to processing logic 310 (e.g., to red eye removal logic 440).

Lighting monitoring device 430 may include any device capable of measuring lighting conditions associated with the subject and/or the eyes of the subject. For example, in one implementation, lighting monitoring device 430 may include an ambient light sensor, a CCD light sensor, a CMOS light sensor, etc. In other implementations, lighting monitoring device 430 may include other components of user device 110 that are capable of measuring lighting conditions, such as processing logic 310. As further shown in FIG. 4, lighting monitoring device 430 may generate lighting sensing signal 170, and may receive lighting information 180 in response to lighting sensing signal 170. Lighting monitoring device 430 may provide lighting information 180 to processing logic 310 (e.g., to red eye removal logic 440).

Red eye removal logic 440 may include any hardware and/or software based logic (e.g., processing logic 310) that enables user device 110 to remove red eye from an image to be captured by user device 110. In one implementation, red eye removal logic 440 may utilize distance information 140, blink information 160, and/or lighting information 180 to automatically or manually remove red eye from an image to be captured by user device 110. In one example, as shown in FIG. 4, red eye removal logic 440 may utilize distance information 140, blink information 160, and/or lighting information 180 to automatically calculate pre-flash information 450. User device 110 may use pre-flash information 450 to automatically remove red eye in an image by intelligently increasing or decreasing a length of time of a pre-flash (e.g., depending on if red eye disappears). In another example, red eye removal logic 440 may utilize distance information 140, blink information 160, and/or lighting information 180 to automatically calculate flash information 460. User device 110 may use flash information 460 to automatically remove red eye in an image by detecting a gaze direction of the subject and delaying a firing of a flash until the subject looks away, by redirecting the flash away from an optical axis of user device 110 so that light from the flash strikes the eyes at an oblique angle (e.g., the light may enter the eyes in a direction away from the optical axis of user device 110, and may be refocused by the eyes' lenses back along the same axis, which may hide the retinas from user device 110), etc.

In a further example, red eye removal logic 440 may utilize distance information 140, blink information 160, and/or lighting information 180 to determine lighting and/or position information 470. User device 110 may use lighting/position information 470 to remove red eye in an image by instructing a user of user device 110 to manually increase lighting around the subject and/or to manually move user device 110 toward or away from the subject. In still a further example, red eye removal logic 440 may utilize distance information 140, blink information 160, and/or lighting information 180 to automatically calculate other red eye removal information 480. User device 110 may use other red eye removal information 480 to automatically remove red eye in an image by capturing the image without a flash, by opening a lens aperture of user device 110, by reducing shutter speed of user device 110, by using a faster film (e.g., if user device 110 is a contemporary camera), by pushing film development to increase an apparent film speed (e.g., if user device 110 is a contemporary camera), etc.

In one implementation, red eye removal logic 440 may utilize distance information 140, blink information 160, and/or lighting information 180 to automatically remove red eye without any input from the user. For example, red eye removal logic 440 may automatically select a best method for removing red eye (e.g., if the subject's head is moving, the may delay firing of the flash until the angle is better; if it is fairly light, then may use a larger aperture to avoid using flash, etc.), and may automatically remove red eye using the selected method.

Although FIG. 4 shows exemplary components of processing logic 310 and monitoring devices 360, in other implementations, processing logic 310 and monitoring devices 360 may contain fewer, different, or additional components than depicted in FIG. 4. In still other implementations, one or more components of processing logic 310 and monitoring devices 360 may perform one or more other tasks described as being performed by one or more other components of processing logic 310 and monitoring devices 360.

Exemplary User Interfaces

Figure 5:
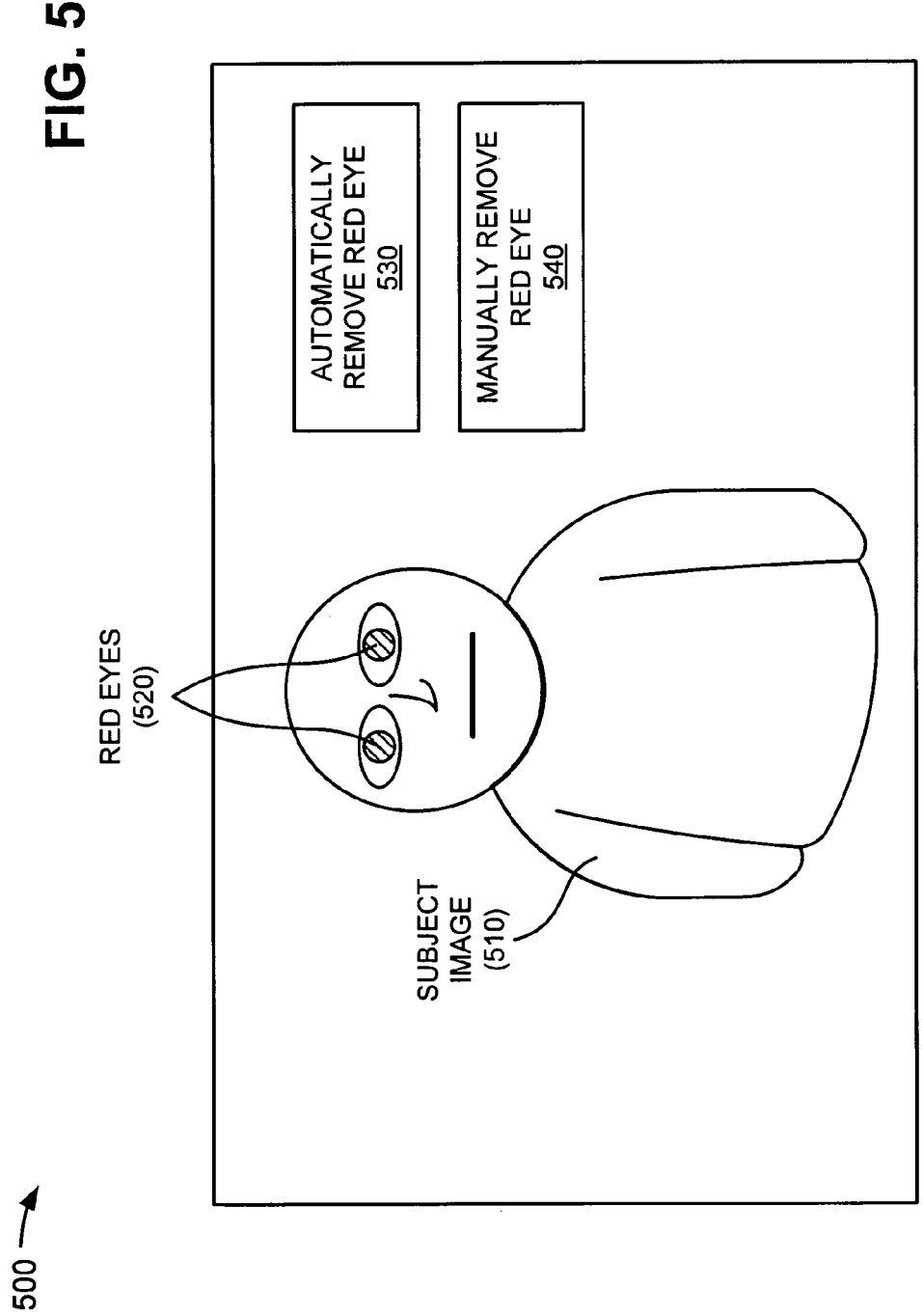
FIGS. 5-7 illustrate exemplary user interfaces capable of being provided by the user device depicted in FIGS. 1 and 2.
Figure 6:
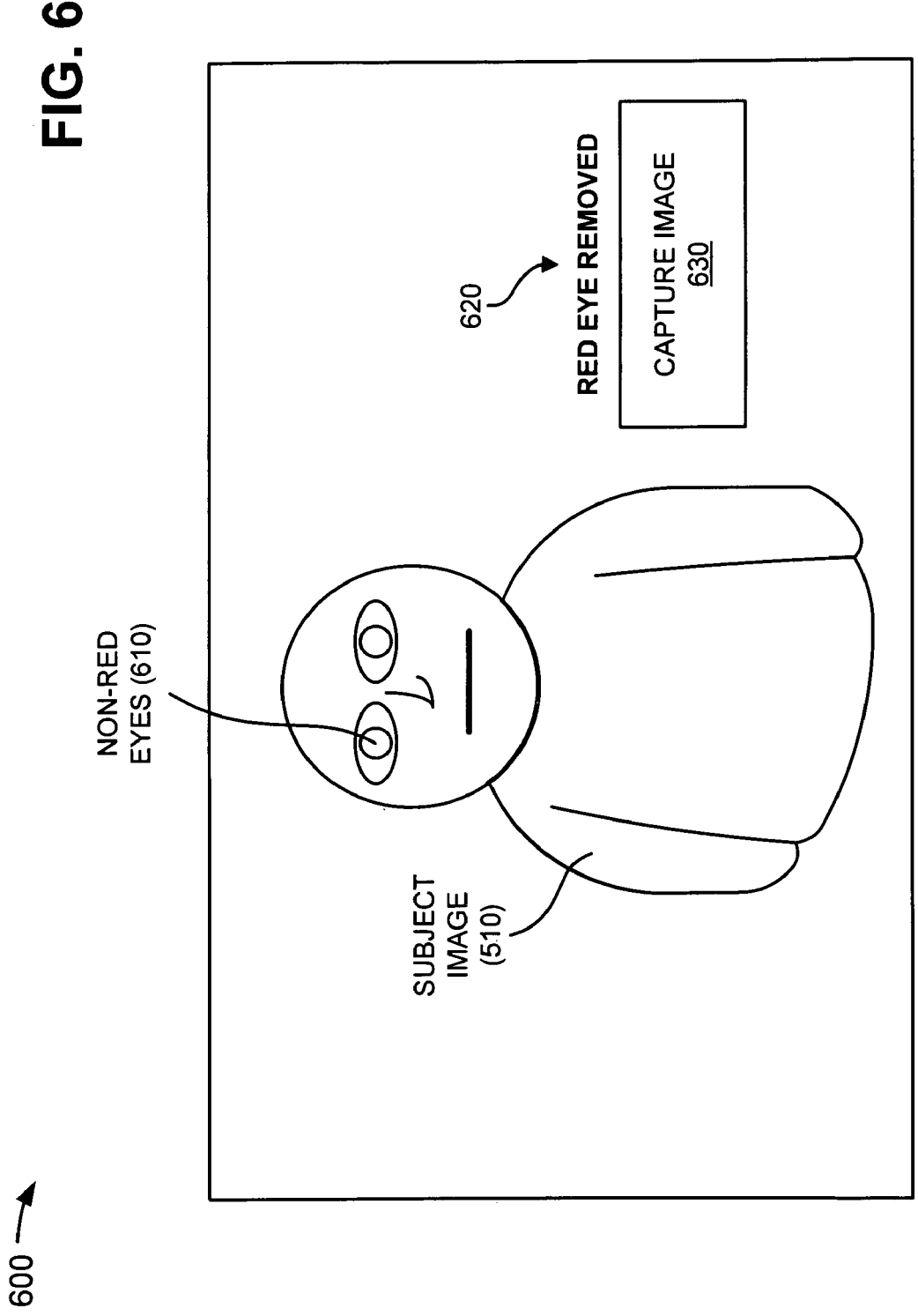
Figure 7:
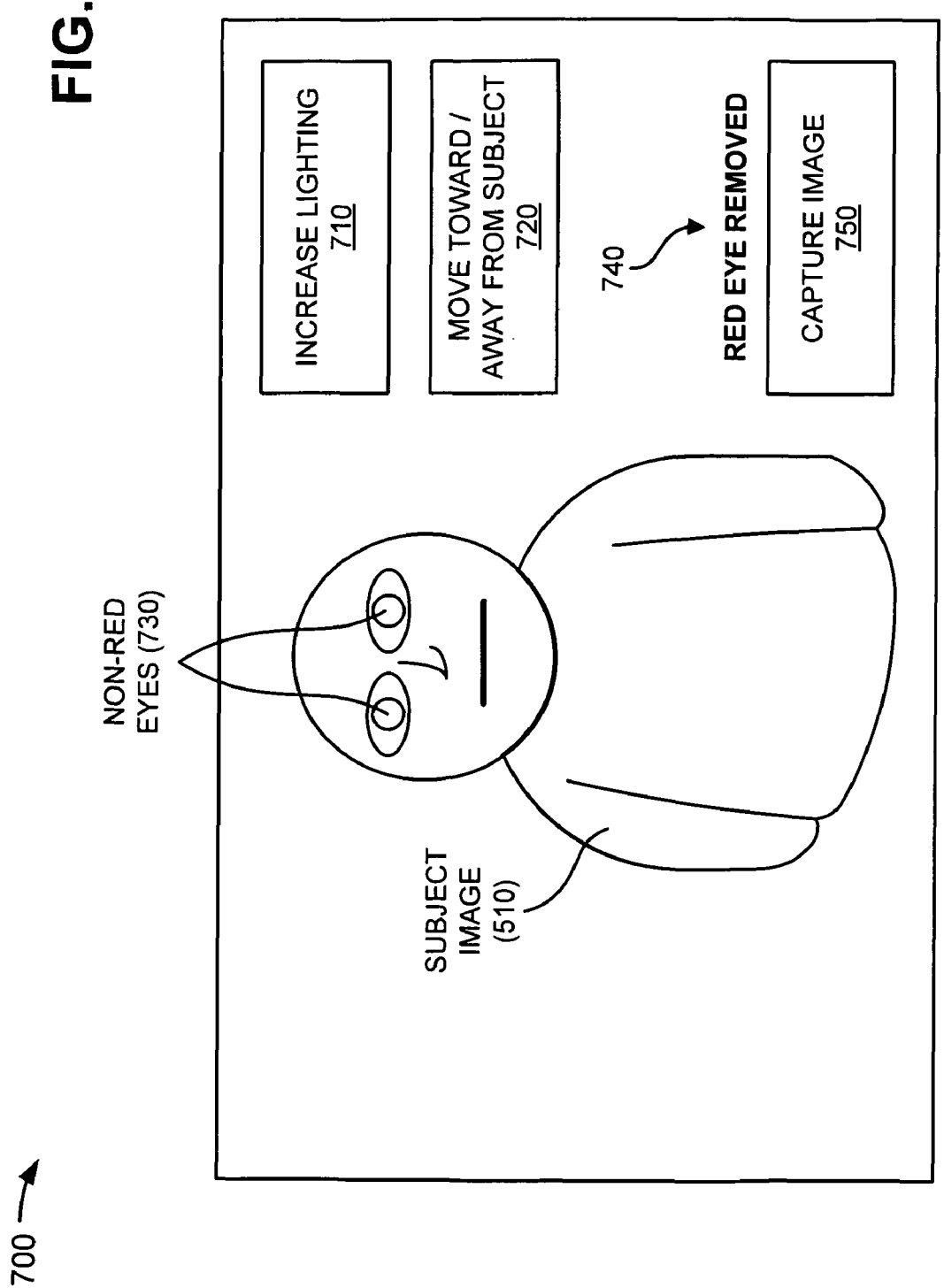

FIGS. 5-7 depict exemplary user interfaces that may be provided by user device 110 (e.g., via user interface 330 and display 220). A user interface 500, as illustrated FIG. 5, may be provided on display 220 of user device 110 if a user aligns a subject with a viewfinder of user device 110. User interface 500 may include a subject image 510, red eyes 520, an automatically remove red eye option 530, and a manually remove red eye option 540.

Subject image 510 may include an image of the subject captured by a viewfinder of user device 110. In one implementation, for example, subject image 510 may include an image of person with red eyes 520 (e.g., experiencing the red-eye effect). If user device 110 captures subject image 510, at this time, the captured image may include unwanted red eyes 520.

Red eyes 520 may be provided by user device 110 in subject image 510 (e.g., where the eyes of the subject image may be determined to be located) if there is a risk of a captured image experiencing the red-eye effect. In one implementation, for example, red eyes 520 may include an eye-shaped image that includes a variety of colors (e.g., red, blue, green, etc.).

Automatically remove red eye option 530 may include a mechanism (e.g., an icon, a button, a link, etc.) that may be selected by a user of user device 110. If the user selects automatically remove red eye option 530, user device 110 (e.g., red eye removal logic 440) may receive the selection, may automatically calculate automated red eye removal settings (e.g., based on the measured distance information 140, blink information 160, and/or lighting information 180), and may automatically remove red eye from subject image 510 based on the calculated automated red eye removal settings, as described above in connection with FIG. 4.

Manually remove red eye option 540 may include a mechanism (e.g., an icon, a button, a link, etc.) that may be selected by a user of user device 110. If the user selects manually remove red eye option 540, user device 110 (e.g., red eye removal logic 440), may receive the selection, may determine red eye removal suggestions (e.g., based on the measured distance information 140, blink information 160, and/or lighting information 180), and may provide for display the manual red eye removal suggestions (e.g., via display 220), as described below in connection with FIG. 7.

If the user selects automatically remove red eye option 530, a user interface 600, as shown in FIG. 6, may be provided on display 220 of user device 110. User device 110 may have calculated the automated red eye removal settings (e.g., based on the measured distance information 140, blink information 160, and/or lighting information 180) and may have automatically removed red eye from subject image 510 based on the calculated automated red eye removal settings. Thus, user interface 600 may include non-red eyes 610, an indication 620 that red eye has been removed, and a capture image option 630.

Non-red eyes 610 may be provided by user device 110 in subject image 510 (e.g., where the eyes of the subject image may be determined to be located) if there is no risk of a captured image experiencing the red-eye effect. In one implementation, for example, non-red eyes 610 may include an eye-shaped image that includes a variety of colors other than red (e.g., black).

Indication 620 may provide a visual indication (e.g., textual, graphical, textual/graphical, etc.) that red eye has been removed from subject image 510. For example, as shown in FIG. 6, indication 620 may state "RED EYE REMOVED." This may provide an indication that subject image 510 is ready to be captured by user device 110.

Capture image option 630 may include a mechanism (e.g., an icon, a button, a link, etc.) that may be selected by a user of user device 110. If the user selects capture image option 630, user device 110 may capture subject image 510 and/or may store the captured subject image 510 (e.g., in memory 320). The captured subject image 510 may not include red eye.

If the user selects manually remove red eye option 540, a user interface 700, as shown in FIG. 7, may be provided on display 220 of user device 110. User device 110 may have determined the manual red eye removal suggestions (e.g., based on the measured distance information 140, blink information 160, and/or lighting information 180) but red eyes 520 (not shown in FIG. 7) may remain in subject image 510 until one or more of the manual red eye removal suggestions are implemented by the user. As illustrated, user interface 700 may include manual red eye removal suggestions, such as an increase lighting suggestion 710 and a move toward/away from subject suggestion 720, non-red eyes 730, an indication 740 that red eye has been removed, and a capture image option 750. Non-red eyes 730, indication 740, and/or capture image option 750 may not be initially displayed by user interface 700 until the user implements one or more of the manual red eye removal suggestions (e.g., increases the lighting around the subject) and red eye is removed. If one or more of the manual red eye removal suggestions eliminates red eye in subject image 510, non-red eyes 730, indication 740, and/or capture image option 750 may be displayed by user interface 700.

Lighting suggestion 710 may provide a visual suggestion (e.g., textual, graphical, textual/graphical, etc.) to increase lighting around, adjacent to, etc. the subject. If the lighting is increased, user device 110 may detect that lighting is sufficient to omit using a flash, which may eliminate red eye in subject image 510.

Move toward/away from subject 720 may provide a visual suggestion (e.g., textual, graphical, textual/graphical, etc.) to move user device 110 toward or away from the subject. Movement of user device 110 toward or away from the subject may omit the need for the flash, which may eliminate red eye in subject image 510.

Non-red eyes 730 may be provided by user device 110 in subject image 510 (e.g., where the eyes of the subject image may be determined to be located) if there is no risk of a captured image experiencing the red-eye effect. In one implementation, for example, non-red eyes 730 may include an eye-shaped image that includes a variety of colors other than red (e.g., black).

Indication 740 may provide a visual indication (e.g., textual, graphical, textual/graphical, etc.) that may be displayed when the manual red eye removal suggestions have eliminated red eye, and may indicate that red eye has been removed from subject image 510. For example, as shown in FIG. 7, indication 740 may state "RED EYE REMOVED." This may provide an indication that subject image 510 is ready to be captured by user device 110.

Capture image option 750 may include a mechanism (e.g., an icon, a button, a link, etc.) that may be displayed when the manual red eye removal suggestions have eliminated red eye, and may be selected by a user of user device 110. If the user selects capture image option 750, user device 110 may capture subject image 510 and/or may store the captured subject image 510 (e.g., in memory 320). The captured subject image 510 may not include red eye.

In one implementation, red eyes may automatically be previewed in a viewfinder (e.g., display 220) of user device 110 in real time by placing red eye graphics (e.g., dots; graphics of red eye pupils, appropriate for the subject image, that may be selected from a library of red eye graphics; etc.) in a position where the eyes of the subject image are located. The red eye graphics may be motion locked to the subject's face (e.g., by motion and/or face tracking) so that the red eye graphics move with the subject. This may provide feedback as to whether red eye is likely, and whether red eye may disappear (e.g., disappear in the viewfinder) because the subject moved (e.g., the subject moved his/her head) or lighting conditions changed (e.g., ambient light is decreased).

Although FIGS. 5-7 show exemplary elements of user interfaces 500-700, in other implementations, user interfaces 500-700 may contain fewer, different, or additional elements than depicted in FIGS. 5-7.

Exemplary Process

FIGS. 8A-10 depict flow charts of an exemplary process 800 for intelligently removing red eye according to implementations described herein. In one implementation, process 800 may be performed by hardware and/or software components of user device 110 (e.g., processing logic 310 and/or red eye removal logic 440). In other implementations, process 800 may be performed by hardware and/or software components of user device 110 (e.g., processing logic 310 and/or red eye removal logic 440) in combination with hardware and/or software components of another device (e.g., communicating with user device 110 via communication interface 340).

As illustrated in FIG. 8A, process 800 may begin with a measurement of a distance from an eye of a subject (block 805), a measurement of a blink of the eye (block 810), and a measurement of lighting adjacent to the subject (block 815). For example, in one implementation described above in connection with FIG. 4, distance monitoring device 410 of user device 110 may generate distance sensing signal 130, and may receive distance information 140 in response to distance sensing signal 130. Distance monitoring device 410 may provide distance information 140 to processing logic 310 (e.g., to red eye removal logic 440) of user device 110. Blink monitoring device 420 of user device 110 may generate blink detection signal 150, and may receive blink information 160 in response to blink detection signal 150. Blink monitoring device 420 may provide blink information 160 to processing logic 310 (e.g., to red eye removal logic 440). Lighting monitoring device 430 may generate lighting sensing signal 170, and may receive lighting information 180 in response to lighting sensing signal 170. Lighting monitoring device 430 may provide lighting information 180 to processing logic 310 (e.g., to red eye removal logic 440).

Returning to FIG. 8A, automated red removal settings may be calculated based on the measured information (block 820), and manual red eye removal suggestions may be determined based the measured information (block 825). For example, in one implementation described above in connection with FIG. 4, red eye removal logic 440 may utilize distance information 140, blink information 160, and/or lighting information 180 to automatically or manually remove red eye from an image to be captured by user device 110. In one example, red eye removal logic 440 may utilize distance information 140, blink information 160, and/or lighting information 180 to automatically calculate pre-flash information 450, which may automatically remove red eye in an image by intelligently increasing or decreasing a length of time of a pre-flash (e.g., depending on if red eye disappears). In another example, red eye removal logic 440 may utilize distance information 140, blink information 160, and/or lighting information 180 to automatically calculate flash information 460, which may automatically remove red eye in an image by detecting a gaze direction of the subject and delaying a firing of a flash until the subject looks away, by redirecting the flash away from an optical axis of user device 110 so that light from the flash strikes the eyes at an oblique angle. In a further example, red eye removal logic 440 may utilize distance information 140, blink information 160, and/or lighting information 180 to determine lighting and/or position information 470, which may remove red eye in an image by instructing a user of user device 110 to manually increase lighting around the subject and/or to manually move user device 110 toward or away from the subject.

As further shown in FIG. 8A, an automatic red eye removal option and a manual red eye removal option may be provided for display (block 830). For example, in one implementation described above in connection with FIG. 5, user interface 500 or user device 110 may display automatically remove red eye option 530 and manually remove red eye option 540. Automatically remove red eye option 530 may include a mechanism (e.g., an icon, a button, a link, etc.) that may be selected by a user of user device 110. Manually remove red eye option 540 may include a mechanism (e.g., an icon, a button, a link, etc.) that may be selected by a user of user device 110. In other implementations, user device 110 may provide the user a single option (i.e., automatically remove red eye option 530 or manually remove red eye option 540).

Figure 8B:
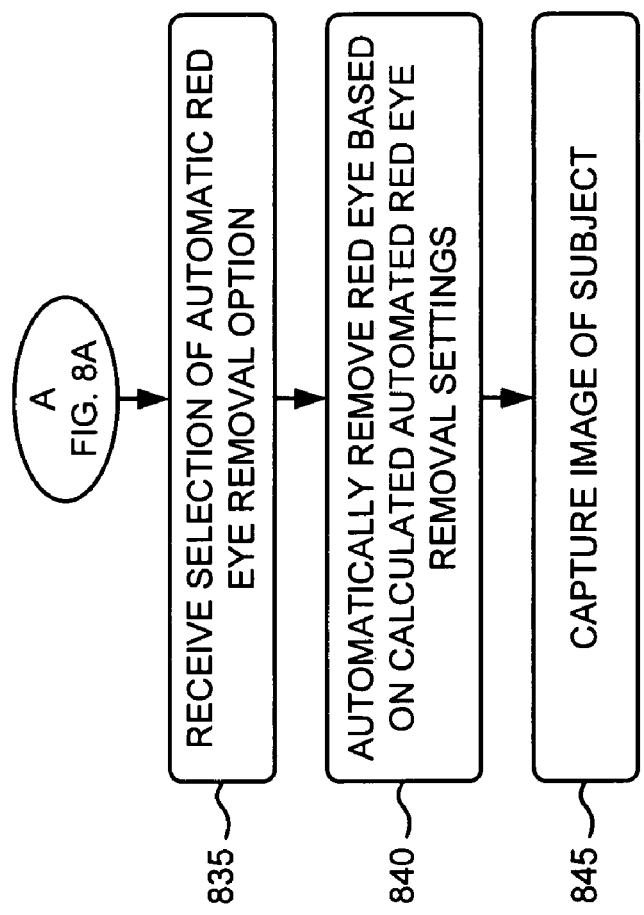
FIGS. 8A-10 depict flow charts of an exemplary process for intelligently removing red eye according to implementations described herein.

If a user of user device 110 selects the displayed automatic red eye removal option (block 830), the process blocks depicted in FIG. 8B may be implemented. As illustrated, a selection of the automatic red eye removal option may be received (block 835), and red eye may be automatically removed based on the calculated automated red eye removal settings (block 840). For example, in one implementation described above in connection with FIG. 5, if the user selects automatically remove red eye option 530, user device 110 (e.g., red eye removal logic 440) may receive the selection, and may automatically remove red eye from subject image 510 based on the calculated automated red eye removal settings.

Returning to FIG. 8B, an image of the subject may be captured (block 845). For example, in one implementation described above in connection with FIG. 6, user interface 600 may be provided on display 220 of user device 110 and may include capture image option 630. Capture image option 630 may include a mechanism (e.g., an icon, a button, a link, etc.)

that may be selected by a user of user device 110. If the user selects capture image option 630, user device 110 may capture subject image 510 and/or may store the captured subject image 510 (e.g., in memory 320). Alternatively, user device 110 may capture the image automatically in response to the selecting automatically remove red eye option 530. In either event, the captured subject image 510 may not include red eye.

Figure 8C:
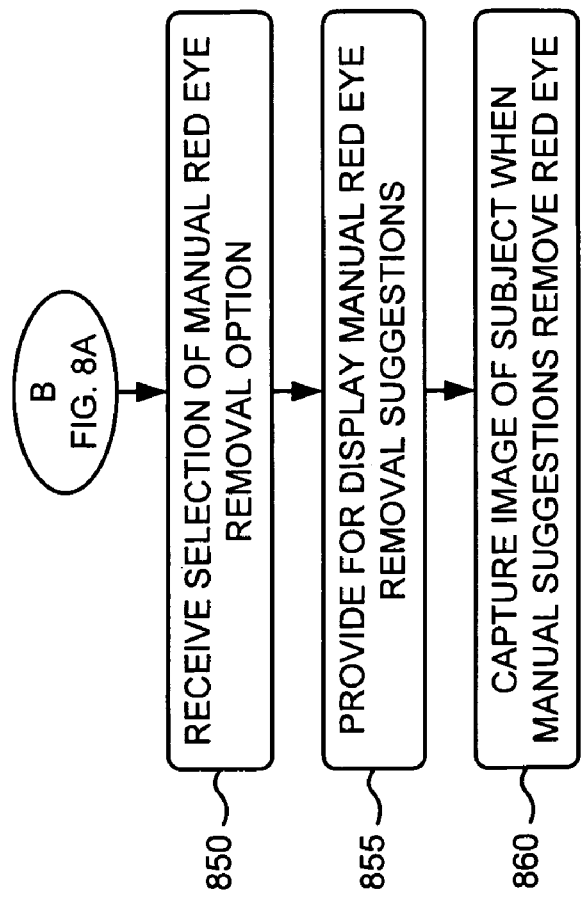

If a user of user device 110 selects the displayed manually red eye removal option (block 830), the process blocks in FIG. 8C may be implemented. As illustrated, a selection of the manual red eye removal option may be received (block 850), and the manual red eye removal suggestions may be provided for display (block 855). For example, in one implementation described above in connection with FIGS. 5 and 7, if the user selects manually remove red eye option 540, user device 110 (e.g., red eye removal logic 440) may receive the selection, and may provide for display the manual red eye removal suggestions (e.g., via user interface 700 on display 220). User interface 700 may include manual red eye removal suggestions, such as increase lighting suggestion 710 and move toward/away from subject suggestion 720. Lighting suggestion 710 may provide a visual suggestion (e.g., textual, graphical, textual/graphical, etc.) to increase lighting around, adjacent to, etc. the subject. If the lighting is increased, user device 110 may detect that lighting is sufficient to omit using a flash, which may eliminate red eye in subject image 510. Move toward/away from subject 720 may provide a visual suggestion (e.g., textual, graphical, textual/graphical, etc.) to move user device 110 toward or away from the subject. Movement of user device 110 toward or away from the subject may eliminate red eye in subject image 510.

Returning to FIG. 8C, an image of the subject may be captured when the manual suggestions remove red eye (block 860). For example, in one implementation described above in connection with FIG. 7, user interface 700 may be provided on display 220 of user device 110 and may include capture image option 750. Capture image option 750 may include a mechanism (e.g., an icon, a button, a link, etc.) that may be displayed when the manual red eye removal suggestions have eliminated red eye, and may be selected by a user of user device 110. If the user selects capture image option 750, user device 110 may capture subject image 510 and/or may store the captured subject image 510 (e.g., in memory 320). The captured subject image 510 may not include red eye.

Figure 9:
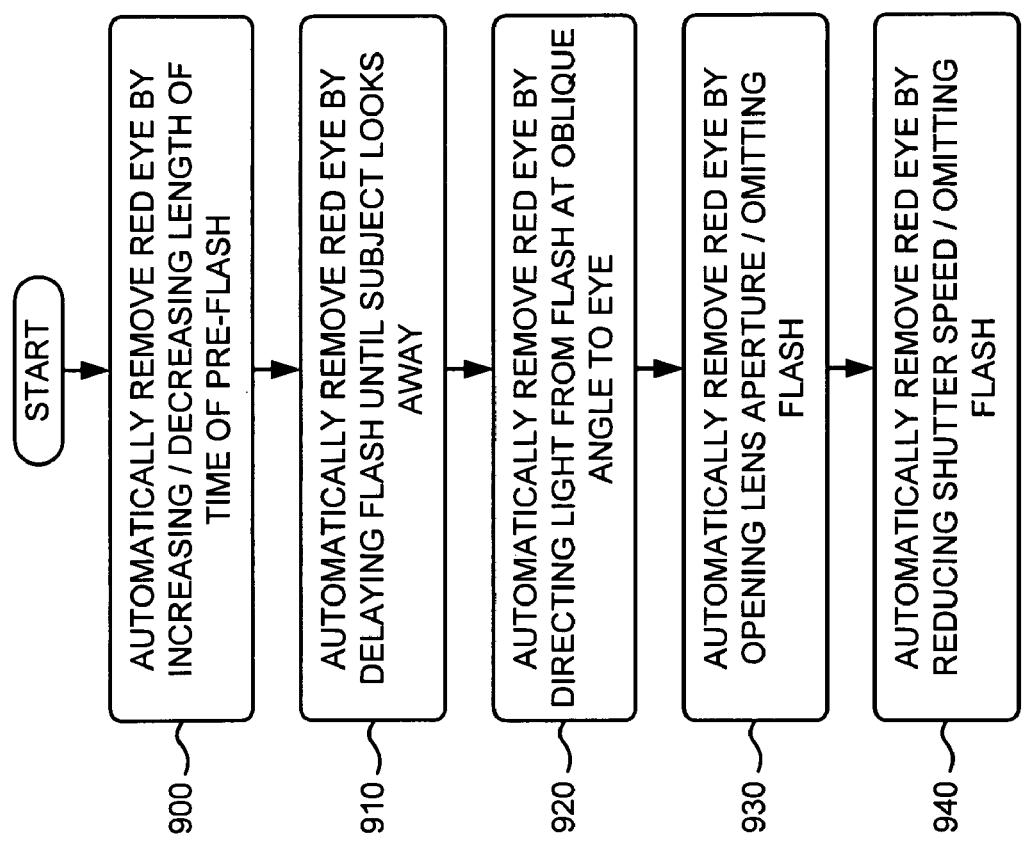

Process block 840 may include the process blocks depicted in FIG. 9. As illustrated, process block 840 may include automatically removing red eye by increasing or decreasing a length of time of a pre-flash (block 900), and/or automatically removing red eye by delaying a flash until the subject looks away (block 910). For example, in one implementation described above in connection with FIG. 4, red eye removal logic 440 may utilize distance information 140, blink information 160, and/or lighting information 180 to automatically calculate pre-flash information 450, which may automatically remove red eye in an image by intelligently increasing or decreasing a length of time of a pre-flash (e.g., depending on if red eye disappears). Red eye removal logic 440 may utilize distance information 140, blink information 160, and/or lighting information 180 to automatically calculate flash information 460, which may automatically remove red eye in an image by detecting a gaze direction of the subject and delaying a firing of a flash until the subject looks away.

Returning to FIG. 9, red eye may be automatically removed by directing light from the flash at an oblique angle to the eye (block 920), red eye may be automatically removed by opening a lens aperture and omitting the flash (block 930), and/or red eye may be automatically removed by reducing a shutter speed and omitting the flash (block 940). For example, in one implementation described above in connection with FIG. 4, red eye removal logic 440 may utilize distance information 140, blink information 160, and/or lighting information 180 to automatically calculate flash information 460, which may automatically remove red eye in an image by redirecting the flash away from an optical axis of user device 110 so that light from the flash strikes the eyes at an oblique angle. Red eye removal logic 440 may utilize distance information 140, blink information 160, and/or lighting information 180 to automatically calculate other red eye removal information 480, which may automatically remove red eye in an image by capturing the image without a flash, by opening a lens aperture, and by reducing shutter speed.

Figure 10:
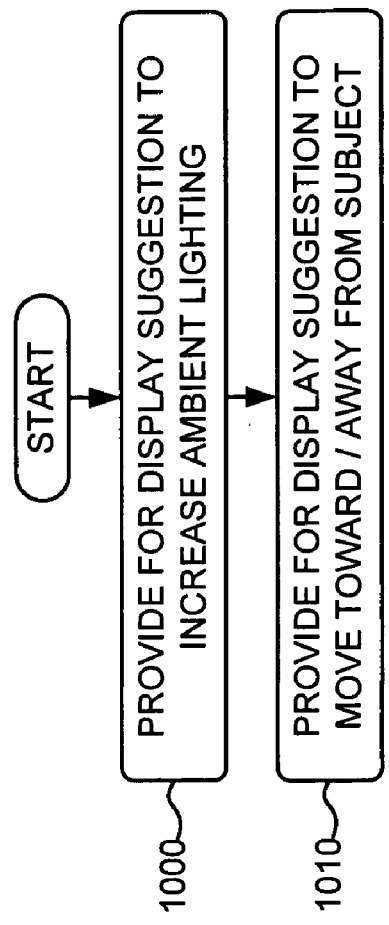

Process block 855 may include the process blocks depicted in FIG. 10. As illustrated, process block 855 may include providing for display a suggestion to increase ambient lighting (block 1000), and/or providing for display a suggestion to move toward or away from the subject (block 1010). For example, in one implementation described above in connection with FIG. 7, user interface 700 may be provided on display 220 of user device 110, and may include manual red eye removal suggestions, such as increase lighting suggestion 710 and move toward/away from subject suggestion 720. Lighting suggestion 710 may provide a visual suggestion (e.g., textual, graphical, textual/graphical, etc.) to increase lighting around, adjacent to, etc. the subject. If the lighting is increased, user device 110 may detect that lighting is sufficient to omit using a flash, which may eliminate red eye in subject image 510. Move toward/away from subject 720 may provide a visual suggestion (e.g., textual, graphical, textual/graphical, etc.) to move user device 110 toward or away from the subject. Movement of user device 110 toward or away from the subject may eliminate red eye in subject image 510.

Conclusion

Implementations described herein may predict red eye by detecting eyes of a subject using eye blinks, and may eliminate red eye by increasing light sensitivity or by adapting a pre-flash length of time based on a risk of red eye. For example, in one implementation, a user device may measure a distance from an eye of the subject, may measure a blink of the subject's eye, and/or may measure lighting adjacent to the subject. The user device may also calculate automated red eye removal settings based on the measured information, may determine manual red eye removal suggestions based on the measured information, and may provide for display an automatic red eye removal option and/or a manual red eye removal option. If the user device receives selection of the automatic red eye removal option, the user device may automatically remove red eye based on the calculated automated red eye removal settings, and may capture an image of the subject. If the user device receives selection of the manual red eye removal option, the user device may provide for display the manual red eye removal suggestions, and may capture the image of the subject when the manual suggestions remove red eye.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8A-10, the order of the blocks may be modified in other implementations. Further, non-dependent blocks may be performed in parallel.

Also, the term "user" has been used herein, and is intended to be broadly interpreted to include user device 110 or a user of user device 110.

It should be emphasized that the term "comprises/comprising" when used in the this specification is taken to specify the presence of stated features, integers, steps or components but does not preclude the presence or addition of one or more other features, integers, steps, components or groups thereof.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   measuring a blink of an eye of a subject and one or more of a distance from the eye of the subject to a user device, or lighting adjacent to the subject;
   calculating automated red eye removal settings based on the measured blink of the eye of the subject, and the one or more of the measured distance from the eye of the subject to a user device or lighting adjacent to the subject;
   automatically removing red eye from an image of the subject based on the calculated automated red eye removal settings;
   capturing the image of the subject; and
   storing the captured image.

2. The method of claim 1, further comprising:
   providing for display, on a display device, an automatic red eye removal option; and
   receiving selection of the automatic red eye removal option.

3. The method of claim 1, further comprising:
   determining manual red eye removal suggestions based on the measured distance, blink, and lighting;
   providing for display a manual red eye removal option;
   receiving selection of the manual red eye removal option;
   providing for display the manual red eye removal suggestions; and
   capturing the image of the subject when the manual red eye removal suggestions remove red eye.

4. The method of claim 3, where providing for display the manual red removal suggestions comprises at least one of:
   providing for display a suggestion to increase ambient lighting; or
   providing for display a suggestion to move toward or away from the subject.

5. The method of claim 1, where automatically removing red eye from an image of the subject comprises at least one of:
   automatically removing red eye from the subject image by increasing or decreasing a length of time of a pre-flash;
   automatically removing red eye from the subject image by delaying a flash of a device until the subject looks away from the device;
   automatically removing red eye from the subject image by directing light from the flash at an oblique angle to the eye;
   automatically removing red eye from the subject image by opening a lens aperture and omitting the flash; or
   automatically removing red eye from the subject image by reducing a shutter speed and omitting the flash.

6. The method of claim 1, where the measuring of the blink of the eye comprises receiving pupil information, and
   where the pupil information includes at least one of abnormal circular shape or a contractile aperture in an iris of the eye.

7. A user device, comprising:
   a distance monitoring device that measures a distance from the user device to an eye of a subject;
   a blink monitoring device that measures, prior to an image of the subject being captured, a blink of the eye of the subject;
   a lighting monitoring device that measures lighting adjacent to the subject; and
   processing logic to:
      calculate automated red eye removal settings based on the measured distance, blink, and lighting,
      automatically remove red eye from the image of the subject based on the calculated automated red eye removal settings, and
      capture the image of the subject.

8. The user device of claim 7, where the distance monitoring device comprises one of:
   a proximity sensor;
   a laser distance sensor;
   a distance sensor using echo location with high frequency sound waves; or
   an infrared distance sensor.

9. The user device of claim 7, where the blink monitoring device comprises one of:
   an eye gazing sensor;
   an infrared camera and infrared illuminator combination; or
   a device used to sense, locate, and follow the movement of the eye.

10. The user device of claim 7, where the blink monitoring device detects the blink as a dual symmetrical difference in images of the subject.

11. The user device of claim 7, where the lighting monitoring device includes one of:
    an ambient light sensor;
    a charge coupled device (CCD) light sensor; or
    a complementary metal oxide semiconductor (CMOS) light sensor.

12. The user device of claim 7, where the processing logic is further to:
    provide for display, on a display of the user device, an automatic red eye removal option; and
    receive selection of the automatic red eye removal option.

13. The user device of claim 12, where the processing logic is further to:
provide for display the subject image with red eyes prior to the automatic removal of red eye;
provide for display the subject image with non-red eyes after the automatic removal of red eye;
provide for display an indication of removal of red eye; and
provide for display instructions for capturing the subject image.

14. The user device of claim 7, where the processing logic is further to:
determine manual red eye removal suggestions based on the measured distance, blink, and lighting;
provide for display a manual red eye removal option;
receive selection of the manual red eye removal option;
provide for display the manual red eye removal suggestions; and
automatically capture the subject image when the manual red eye removal suggestions remove red eye.

15. The user device of claim 14, where the processing logic is further to at least one of:
provide for display a suggestion to increase ambient lighting; or
provide for display a suggestion to move toward or away from the subject.

16. The user device of claim 15, where the processing logic is further to:
provide for display the subject image with red eyes prior to the manual removal of red eye;
provide for display the subject image with non-red eyes when the manual red eye removal suggestions remove red eye;
provide for display an indication of removal of red eye; and
provide for display instructions for capturing the subject image.

17. The user device of claim 7, where the processing logic is further to at least one of:
automatically remove red eye from the subject image by increasing or decreasing a length of time of a pre-flash;
automatically remove red eye from the subject image by delaying a flash until the subject looks away from the user device;
automatically remove red eye from the subject image by directing light from the flash at an oblique angle to the eye;
automatically remove red eye from the subject image by opening a lens aperture and omitting the flash; or
automatically remove red eye from the subject image by reducing a shutter speed and omitting the flash.

18. The user device of claim 7, where the user device comprises one of:
a mobile communication device;
a laptop;
a personal computer;
a camera;
a video camera;
binoculars with a camera; or
a telescope with a camera.

19. A user device, comprising:
one or more devices to:
measure a distance from an eye of a subject whose image is to be captured,
measure a blink of the eye of the subject whose image is to be captured, and
measure lighting adjacent to the subject; and
processing logic to:
provide for display an automatic red eye removal option and a manual red eye removal option,
receive selection of the automatic red eye removal option or the manual red eye removal option,
calculate automated red eye removal settings based on the measured distance, blink, and lighting when the automatic red eye removal option is selected,
automatically remove red eye from an image of the subject based on the calculated automated red eye removal settings when the automatic red eye removal option is selected,
determine manual red eye removal suggestions based on the measured distance, blink, and lighting when the manual red eye removal option is selected,
provide for display the manual red eye removal suggestions when the manual red eye removal option is selected, and
enable the subject image to be captured when red eye is removed.

20. The user device of claim 19, where the processing logic is further to:
provide for display the subject image with red eyes prior to the removal of red eye;
provide for display the subject image with non-red eyes when red eye is removed;
provide for display an indication of removal of red eye; and
provide for display instructions for capturing the subject image.

21. A system, comprising:
means for measuring a distance from an eye of a subject;
means for measuring a blink of the eye prior to capturing an image of the subject;
means for measuring lighting adjacent to the subject;
means for calculating automated red eye removal settings based on the measured distance, blink, and lighting;
means for automatically removing red eye from the image of the subject based on the calculated automated red eye removal settings;
means for capturing the image of the subject; and
means for storing the captured subject image.

22. The system of claim 21, where the means for measuring the blink of the eye comprises:
means for locating a center of a pupil,
means for creating a corneal reflection, and
means for determining the blink of the eye using a triangulation of the located center of the pupil and the created corneal reflection.

* * * * *